United States Patent [19]

Sciortino

[11] 4,456,165

[45] * Jun. 26, 1984

[54] BREAK-AWAY SECURITY MEANS FOR SELF-LOCKING COVERED COIN RECEPTACLE

[76] Inventor: August M. Sciortino, 1838 Weeg Way, Park Ridge, Ill. 60068

[ * ] Notice: The portion of the term of this patent subsequent to Feb. 8, 2000 has been disclaimed.

[21] Appl. No.: 320,171

[22] Filed: Nov. 12, 1981

[51] Int. Cl.[3] ........................ G07B 15/00; G05B 63/00

[52] U.S. Cl. ........................................ 232/15; 232/16; 70/422; 70/1.5

[58] Field of Search ........................ 232/15, 16, 55, 57, 232/58, 59, 63; 70/422, 1.5, 416

[56] References Cited

U.S. PATENT DOCUMENTS

| | | | |
|---|---|---|---|
| 1,627,300 | 5/1927 | Wood | 70/422 |
| 1,857,971 | 5/1932 | Oleschak | 70/1.5 |
| 2,609,679 | 9/1952 | Bremer et al. | 70/422 |
| 2,973,139 | 2/1961 | Leone et al. | 232/15 |
| 4,289,269 | 9/1981 | Sciortino | 232/16 |
| 4,359,184 | 4/1980 | Sciortino | 232/16 |
| 4,372,479 | 2/1983 | Sciortino | 232/15 |

FOREIGN PATENT DOCUMENTS

| | | | |
|---|---|---|---|
| 1570188 | 6/1980 | United Kingdom | 70/422 |

*Primary Examiner*—Gene Mancene
*Assistant Examiner*—John G. Weiss
*Attorney, Agent, or Firm*—Silverman, Cass & Singer, Ltd.

[57] ABSTRACT

In a self-locking covered coin receptacle such as employed in coin-controlled machines, and of the type wherein the cover includes a channeled member carrying a window and slidably telescopically received within a second channeled member carrying an open-topped flexible bag to be aligned with the window and a spring biased slide is installed on the floor of the channel defined within said first member and operates between a first condition covering the window and a second condition uncovering the window and a band spring member removably is fastened to the first member and includes a bent latch formation arranged to ride the slide when the same is moved to uncover the window, and to block movement of the slide when the window is covered by return of said slide; in order to defeat the possibility of nonevidentiary unauthorized access being established by lifting, tampering or otherwise manipulating the band spring to release same from its blocking condition, a transverse score is formed in the spring near the bend. Attempts to improperly lift, temper or otherwise externally manipulate the spring will cause the bent formation to become detached, leaving visible evidence of the attempt.

13 Claims, 6 Drawing Figures

BREAK-AWAY SECURITY MEANS FOR SELF-LOCKING COVERED COIN RECEPTACLE

CROSS-REFERENCE TO RELATED APPLICATIONS

This application is an improvement of the copending Ser. No. 238,617 filed Feb. 26, 1981, now U.S. Pat. No. 4,372,479, by applicant herein, the subject matter of said patent application being incorporated by reference herein and made a part hereof to supply background of this invention.

Reference also is made to applicant's pending application Ser. No. 136,889 filed Apr. 3, 1980, now U.S. Pat. No. 4,359,184, entitled "SELF LOCKING COIN RECEPTACLE AND COVER THEREFOR", the subject matter of said patent application also being hereby incorporated by reference herein and made a part hereof to supply background of the invention.

BACKGROUND OF THE INVENTION

This invention relates generally to self-locking covers for coin containers of the type used with coin-controlled machines, and provides means for preventing undetected unauthorized access to the locked receptacle by manipulation of the locking mechanism.

Vending machines operated by coins normally have coin containers such as coin boxes or similar receptacles to receive the coins dropped into the machine by those who have purchased merchandise from the machines. Such coin containers are locked into prefabricated recesses provided in the machines. When the machine is serviced, the serviceman removes the loaded coin receptacle, empties it and replaces it within the recess with an empty one.

For security purposes it has become customary to have a coin container which is locked, and remains locked until it is returned to the proprietor of the vending machine or to an authorized counting station whereat it can be opened and the coins removed. In such cases, the serviceman is provided with an empty, locked container so that when the loaded container is removed from the enclosure, a fresh, empty container replacement can be installed.

In order to prevent pilferage from the coin container subsequent to removal from the machine, the serviceman is not even given keys thereto.

The coin receptacle must be in condition to receive the coins when the serviceman installs the same within the enclosure provided in the machine. Normally there is a window in the top of the container which is opened on installation and remains open after installation for receipt of coins. When the receptacle is removed from the machine, removal automatically locks the window in closed condition. This window remains in closed condition until authorized access is gained for retrieval of the contents. Attempts to gain access to the interior thereof for the surreptitious non-detachable removal of coins therefrom must be thwarted.

In recent years, receptacles in the form of covered coin bags have gained wide acceptance over lock boxes. Applicant's self-locking cover assembly disclosed in Ser. No. 136,889 was especially suitable for use with coin bags.

The referenced application Ser. Nos. 136,889 and 238,617 provided a self-locking cover assembly for a coin container wherein the cover includes a first channel member open at one end and having a slide arranged in the channel. A second channel member carrying a flexible coin bag is telescopically received in the first channel member to complete the cover assembly. A window is formed in the top wall of the first channel member. The window is located to enable alignment with the delivery end of the coin chute of the coin controlled machine when the bag and locked cover assembly is installed fully into the machine. The slide is movable during entry into the enclosure between a condition whereat the window is blocked to a condition in which the window is open. Means are provided to maintain the open condition thereof while the container remains installed. Means also are provided whereby during and subsequent to the withdrawal of the coin box from the enclosure, the window is blocked and access may not be gained thereto by covert or surreptitious action. In particular, spring means are employed ridable on the slide during uncovering of the window and upon withdrawal against the one edge of the slide to prevent access to be gained to the window. Once installed within the designated enclosure, the locked assembly cannot be withdrawn unless the window is closed off. Once the container is withdrawn, the window cannot be uncovered covertly without detection. Means also were provided to prevent withdrawal of the locked container from the enclosure area so long as the window is even partially uncovered, and to prevent return of the container once it has been removed unless the locking means have been reset.

Once the loaded coin bag and cover assembly was withdrawn from the holding bracket within the coin operated machine, it was transported to a secured counting area where the seal thereof was severed, cover parts separated and access to the loaded coin bag obtained. Once the bag was emptied and its contents accounted for, the locking mechanism was reset to permit reassembly of the cover. Unless the parts were reassembled, with the locking mechanism properly reset, reentry into a holding bracket of a coin operated machine was not possible, since the slide mechanism could not be operated.

The band spring means which slides on the slide member include an end bent portion serving to block movement of the slide upon withdrawal of the covered bag from the coin machine. This spring must be manipulated to reset the valve and release the slide from its blocking condition relative to the slide. As with all security devices, there is always a desired to construct the device so as to forestall the possibility that an enterprising individual may devise as yet unforeseen manipulations or maneuverings which may defeat the expedients provided to prevent nondetectable covert or surreptitious access to the receptacle.

Since the band spring means included in the earlier constructions rode the slide and functioned to prevent access by blocking movement of the slide so that the window could not be uncovered without leaving evidence of the attempt, it could be possible to gain access to the spring and manipulating a tool to lift the spring from its blocking condition. This may be highly unlikely but nevertheless, given the desire, surreptitious entry might be remotely possible.

Even such unlikely occurrence deserves the provision of means whereby evidence would remain indicating attempts, successful or otherwise, to gain entry by manipulation of the band spring from its slide-blocking condition.

SUMMARY OF THE INVENTION

In a self-locking cover assembly for a coin receptacle for coin-controlled machines, the cover assembly including a pair of telescopically engageable members, said members being capable of limited reciprocation between a latched fully telescopically engaged condition and a partially separated condition, said cover having spring biased locking means comprising band spring means serving to block access to the interior of the coin receptacle; the invention comprising said band spring means having a transverse score formed therein whereby attempts forceably to displace said spring means will result in a breakaway section thereof being separated, disabling the locking means and preventing access.

DESCRIPTION OF PREFERRED EMBODIMENT

Figure 1:
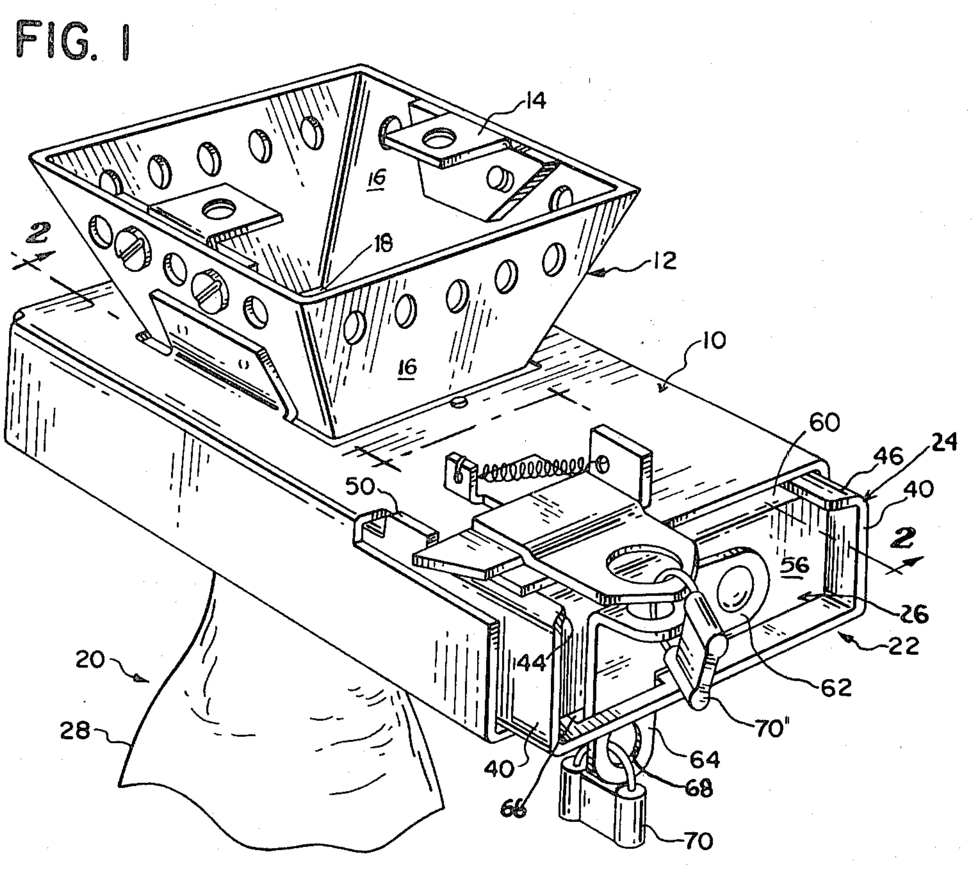
FIG. 1 is a perspective view looking downward of the type of locked covered coin receptacle bag wherein the breakaway spring means according to the invention is installed.

The invention herein is concerned with self-locking covered coin receptacles of the type disclosed in patent application Ser. Nos. 238,617 and 136,889 and wherein a spring biased slide is biased normally to block the window of the cover through which coins enter the receptacle when same is installed.

A cammed detent extends into the window when the slide is displaced against its normal bias during installation of the covered coin receptacle into the coin machine. The detent cooperates with the coin chute of the machine or its equivalent to block the removal of the covered receptacle from the machine unless the aforementioned window is blocked fully by the slide, return movement of the slide normally causing the detent to be retracted.

The devices disclosed in the referenced applications include a band spring having one end secured removably to the cover. The band spring has a bent formation at its free end biased to ride the slide during displacement of said slide. A spring biased plate or blade is mounted on the slide for pivotal movement in a plane parallel to the slide surface. The blade is carried by the slide. A notch is formed in the slide at one edge thereof and at a location on the slide aligned with the bent formation of the band spring when same is installed in the cover.

In the primed condition of the device, the blade normally is interposed between said bent formation and the notch. When the primed covered coin receptacle is introduced into its receiver, the slide is actuated to uncover the window. The bent formation first rides the surface of the blade, then drops to the slide surface. The slide and blade travel together during opening of the window. When the window is open fully, the blade is disposed rearward of the bent formation carried on the slide since the blade pivots about its mounting.

When withdrawal of the covered coin receptacle is effected, say for replacement of a coin-filled receptacle for a fresh one, the covered receptacle is withdrawn from its installation. As withdrawal is initiated, the slide is released to resume its normal condition, covering the window. Simultaneously, the detent is cammed to retract the same, such retraction not being completed until the slide has been translated sufficiently to cover the window.

As the slide moves to the position assumed with the window covered fully, the blade edge is intercepted by the bent formation of the band spring. As the slide continues to move toward the condition assumed thereby when the window is covered fully, the blade pivots abouts its mounting to uncover the notch and the bent formation falls off the slide, enters the notch and engages the floor of the cover. The blade, now pivoted against its normal biased condition, bears against the rear of the bent formation, forcing same against the edge of the slide so long as the bent formation is disposed within the notch. Accordingly, movement of the slide in a direction necessary to again uncover the window is prevented.

It should be pointed out that the deterrence afforded by the invention is directed against surreptitious pilfering or tampering, that is, tampering without leaving evidence thereof for detection. Of course, if a thief desires to gain unauthorized access to the receptacle for the purpose of a theft, he can slash the bag or apply force to the cover sufficient to gain access thereto. Obviously, immediate recognition is gained of the event because of the visible and obvious damage to the receptacle and/or cover.

When the locked covered coin receptacle was brought to the secure counting room, say at a depository, an exterior seal is broken. The cover portions heretofore were separated, the bag emptied of coins and the coins counted or otherwise tabulated. Prior to reassembly of cover portions, the lock mechanism had to be primed (cooked or reset).

In order to prime the lock mechanism, the bent formation of the band spring had to be lifted manually to release the blade from the notch so as to reset or prime the mechanism. The structure disclosed in Ser. No. 238,617 had a resetting mechanism which could be reset or primed automatically upon opening of the cover portions for authorized access.

The cover portions having been separated were reassembled to define a fresh coin receptacle ready for installation anew. The provision of the pivotable blade positively prevents tape or any other objects from effectively neutralizing the self-locking feature of the cover.

Although the constructions described hereinabove and in the referenced applications were designed to be secure against nonevidentiary tampering, the chances exist that an offending individual may attempt, successfully or otherwise, to manipulate the band spring to lift the same, defeating the blocking function of the bent formation seated in the notch formed in the slide member.

The invention herein is concerned with providing means whereby an attempt forceably to lift or otherwise tamper with the band spring say to lift the same from the notch as by employing a blade or other probing tool will disable the locking mechanism and/or leave telltale evidence of such attempt which would be detectable by an observer.

Now looking at the drawing, the receptacle adapted to be located within the coin machine for receiving the cover/bag combination of the invention includes a channel-shaped bracket 10. The covered coin bag assembly of the invention is designated by reference character 20. Most of the elements present in the self-locking covered flexible coin bag assembly are common with referenced application Ser. No. 238,617 which assembly is employed herein as receiving an embodiment of the instant invention installed therein.

Figure 2:
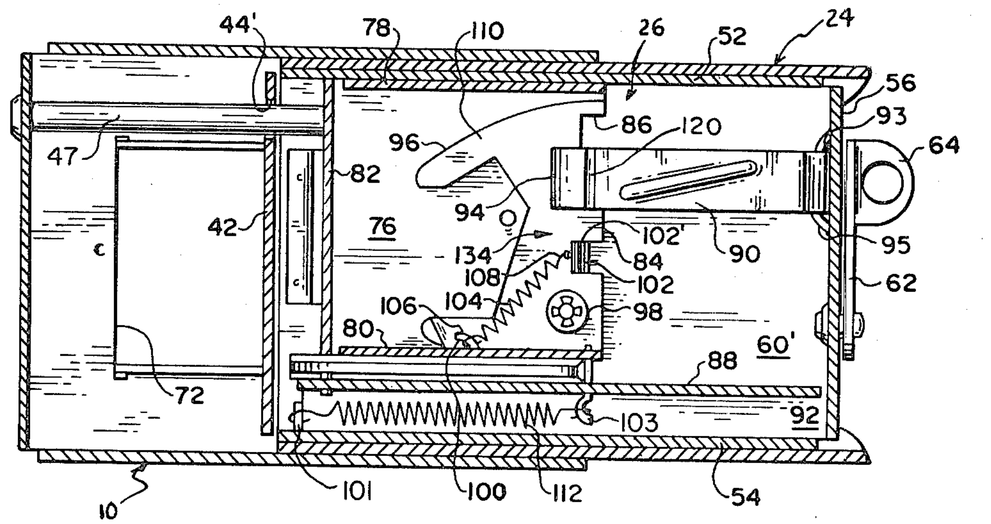
FIG. 2 is a fragmentary sectional view taken along lines 2—2 of FIG. 1.
Figure 3:
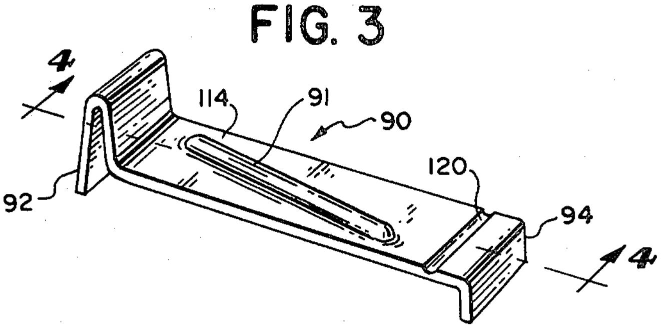
FIG. 3 is a perspective view of the spring means taken along lines 2—2 of FIG. 1 and viewed in the direction indicated by the arrows.
Figure 4:
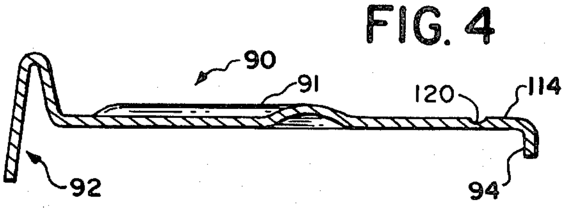
FIG. 4 is a sectional view taken along lines 4—4 of FIG. 3.

For that reason, reference is made to FIGS. 1 and 2 of the drawing wherein a locked, covered flexible coin bag assembly 20 is illustrated installed within said channel-shaped bracket 10 which carries a coin funnel 12. The funnel 12 is installed via tabs 14 within a conventional coin-receiving housing (not shown) fabricated in a coin-operated machine. Coins land onto one of the tapered walls 16 of funnel 12 and are directed to the bottom opening 18. The plural tabs 14 provide for universal installation capability.

The cover unit 22 of assembly 20 is formed of a pair of telescopically assembled cover portions 24 and 26 of generally rectangular configuration. A flexible, open-topped bag 28 formed of plastic or cloth material is secured onto one of said members.

The bag 28, like the equivalent bag of the copending application Ser. No. 238,617, now U.S. Pat. No. 4,372,203, is provided with a collar 30 having an undercut rim 32 capable of being received within the circular rimmed opening 34 formed in the member 24. The opening 34 is located for alignment with the bottom opening 18 of the funnel 12 when the assembly 20 is installed within channeled bracket 10. As shown in the said referenced application Ser. No. 238,617, the rim 32 is locked in place by a split retaining ring 36 seated on rim 32 surrounding opening 34 and within circumferential groove 38 formed on rim 32 defining a swivel coupling. The bag 28 is secured to the collar so as to resist separation when installed.

Cover portion 24 includes a pair of parallel side walls 40 and an end wall 42, the same having an aperture 44' formed therein. The side walls 40 have right angle flanges 44 and 46. Means such as a bar 47 are provided within the bracket 10 to drive the slide during installation. Flanges 44 and 46 define a track. Upstanding tab 50 is provided formed as an upset of flanges 44 and functions as a stop for retaining the assembled covered coin bag assembly within the bracket of the machine, as will be explained hereinafter.

The cover portion 26 holds the operating mechanisms of the cover unit 22 and includes a pair of parallel side walls 52 and 54 and end wall 56 and bridging wall 60. A pivotable latch 62 including latch hook 64 is secured to the end wall 56. The cover portion 24 carries a slot 66 located to receive the latch hook 64 when the portion 26 is received telescopically fully in portion 24. The latch 62 is rotatable pivotably into and out from the slot 66. The latch 62 also carries an aperture 68 located at the free end thereof and a plastic locking seal 70 can be passed therethrough after the latch 62 is manipulated to feed latch hook 64 through slot 66. Once seal 70 is applied and locked, breaking of the seal is required to gain access to the interior of assembly 20. This cannot be performed surreptitiously, that is, without observable detection. A second seal 70' can secure the latch 62 to the bracket 10.

The cover portion 26 has a window 72 as well as a longitudinal slot (not shown) opening to one corner of window 72.

A spring-biased slide assembly is arranged within the cover portion 26 for covering and uncovering the window 72. The slide assembly includes a flat slide 76 having a pair of parallel upstanding side walls 78,80 and a bridging end wall 82. The trailing edge 84 of slide 76 has a notch 86 formed therein. Reference is made to Ser. No. 238,617, now Pat. No. 4,372,479 for a more detailed description of the interior construction.

A generally flat band spring 90 having a clip portion 92 at one end and a downwardly bent end formation 94 at its opposite end, removably is secured to wall 56 of cover portion 26. The band spring 90 is provided with a rib 91 for strengthening purposes.

The band spring 90 is arranged parallel to the floor 60' of cover portion 26 and also extends in a direction parallel to the side walls 52,54 of said cover portion 26. Floor 60' forms the undersurface of wall 60 of cover portion 26. The bent portion 94 is angled downwardly so that the spring 90 is spaced from floor 60' from its mounting location on wall 56 toward its bent end formation 94 whereby said formation 94, which may be described as a latch or catch formation, is biased toward the floor 60'. The formation 94 normally is seated in the notch 86 formed at the trailing edge of slide 76. Thus when mounted on wall 56, the band spring 90 is cantilevered toward the floor 60' with the bent formation 94 either seated on the slide 76, or seated within notch 86.

A flat "shutter" blade 96 is secured at 98 for slidable pivotal movement upon the slide 76 in a plane parallel to said slide. Wall 80 of slide 76 carries eye formation 100. An apertured lug 102 mounts coil spring 104 having one arm 106 seated in eye formation 100. The slide 76 carries an upstanding lug 102', the opposite arm 108 of spring 90 is secured to and wrapped about upstanding lug 102'.

The blade 96 rides with the slide 76 and includes a large flat section 110 also slidable on the surface of slide 76 with pivotal movement of the blade 96. The section 110 is disposed to be interposed between formation 94 and the slide 76 and rests flat on the surface of slide 76.

Normally, the bent formation 94 of band spring 90 rests upon the blade section 110. While in such condition, no impediment is offered to movement of the slide 76 to uncover the window 72. When the slide 76 is caused to move to uncover the window 72, as by post 46 passing through opening 44' in end wall 42 as the cover is forced into bracket 10, the post 46 engages the wall 82 of the slide 76 and forces the slide 76 to move against its normal bias to uncover the window 72. The slide is moved in the direction toward wall 56 of cover portion 26. The detent is cammed into the slot (not shown) and then passes through window 72. The blade 96 and slide 76 move together. The bend formation 94 rests on the blade surface 110 and the conjointly moving slide and blade is translated past formation 94. The full opening of the window 72 is accomplished with slide and blade fully translated to the left in the Figures.

Obviously, to accomplish such movement, the bend formation 94 must ride on the blade 96, pass over the blade 96 and drop to the slide surface.

Now, when the covered coin receptacle 20 is introduced further into bracket 12 and passes telescopically thereinto, the bent formation 94 drops off the blade surface 110 and rides the slide surface. The slide is positioned at its extreme left hand location against the bias of spring 112 and thus is biased towards its window-covering condition. In the return trip, taken when the loaded covered receptacle 20 is released from the bracket 10. The bent formation 94 rides the slide surface and pushes against the blade 96, causing said blade 96 to pivot in a horizontal direction. The bent formation drops off said slide surface and engages the floor 60' of the cover portion 26. The bent formation 94 drops into notch 86. When window 72 is opened fully, the spring 104 forces bent formation 94 against the trailing edge of slide 76. In traveling, the blade 96 is forced to pivot against the bias of spring 104.

When the covered loaded coin receptacle 20 is released from bracket 10, the slide 76 moves under the bias supplied by spring 112 to return to said normal condition, that is, with the window 72 closed. The spring 112 is supported between lug 101 carried on wall 54 of cover member 26 and lug 103 carried on wall 80 of slide 76. The trailing edge of the blade 96 engages the rear of the bent formation 94. When formation 94 is seated within notch 86 of the slide, it is biased against the said trailing edge of said slide at said notch 86. The slide 76 is blocked from further slidable movement in a direction required to expose the window 72. This effectively locks the cover with the window blocked. Access to the interior of the bag is prevented while the bent formation 94 of band spring 90 remains within the notch 86 blocking the movement of the slide 76 so that the window 72 cannot be opened.

Lifting of the bent formation 94 from its disposition within notch 86 may be accomplished easily using a simple tool when portions 24 and 26 are separated.

According to the referenced application Ser. No. 238,617 the locking mechanism can be reset automatically by lifting the bent formation 94 from the notch 86 during separation of cover portions 24 and 26 occurring the opening of the cover unit 22. As the spring 90 is lifted, the blade 96 is released to return fully. In the course of its return, the blade 96 under the bias of spring 104 cams the bent formation 94 so that the bend rides surface 110. That is, the bent formation 94 is guided over the blocking trailing edge of slide 76 being raised by the blade 96 during the return of said blade to its normal conditon on the slide 76 and without excessive force being used. With the bent formation 94 out of the notch 86 and slidable on blade surface 110, the structure is reset. Reference is made to the specification of Ser. No. 238,617 for a more detailed description of the automatic reset mechanism and the construction thereof.

Since the release of the bent formation 94 from notch 86 must be effected for gaining access to the window, it is logical for one intending to gain surreptitious entry to attempt to lift the bent formation 94 from its repose within notch 86. Perhaps manipulation of an elongate probe, blade, etc. beneath the spring 90 or beneath a portion of formation 94 or to grasp the bent formation 94 and pivot same upward, would be sufficient to release the formation and hence the slide.

This possibility, although remote, offers a danger to the security of the locked coin bag 20.

Figure 5:
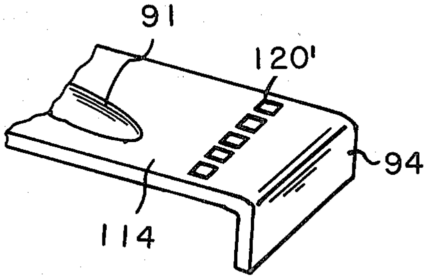
FIG. 5 is a fragmentary perspective of the spring clip of FIG. 3 but illustrating a modified embodiment of the invention and FIG. 6 is a fragmentary sectional view illustrating the manner of attaching the coin bag to the cover.
Figure 6:
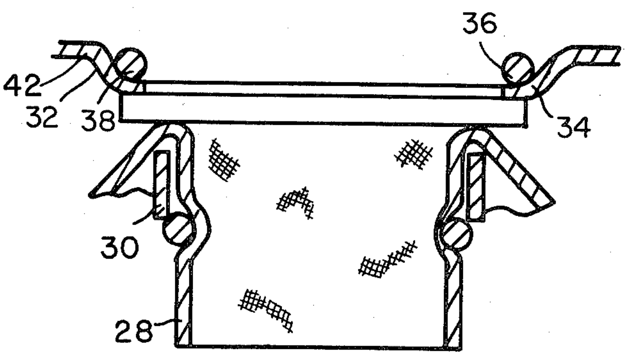

According to the herein invention, the band spring 90 includes a planar portion 114 located between the rib formation and the bent formation 94. A transverse score 120 is formed in planar portion 114 across same. As illustrated, the score 120 is continuous. However, the score may comprise an intermittent series of weakened portions, perforate or simply partial depressions, cuts or a groove, the partial perforations 120' being illustrated in FIG. 5. The score 120 is of such depth as to permit lifting of the bent formation manually without forcing same, as when the cover has been opened under authorized conditions or automatically, as when the resetting means of Ser. No. 136,889 are employed.

However, the force normally required to lift the bent formation 94 is substantially less than that required say by manipulation with a tool from the exterior of the cover, for example. When the latter force is used, the bent formation will be severed from the rest of the spring 90 along the score 120.

The remaining broken end of band spring 90 may be caused to bear against the trailing edge of the slide within the notch and may be forced into the notch and bear against the trailing edge of the slide. While the window 72 may be at most partially uncovered, full access thereto is not permitted. Further, the absence of the broken away bent formation 94 is clear and unalterable evidence of tampering. The provision of strengthening rib 91 assures that the band spring will be severed at the scored or weakened location, that is, the desired location.

The score 120 may be formed directly across the width of the band spring or may comprise a diagonal formation transverse said spring.

With the invention there is no apparent way to pry or otherwise exert force upon the band spring sufficient to lift the bent formation 94 from the notch 86 without some breaking away, leaving the telltale evidence.

Variations may be made in the apparatus of the invention without departing from the spirit or scope of the invention as defined in the appended claims.

What I claim is:

1. For use in a self-locking cover assembly for a coin receptacle mountable within a channeled bracket which is secured in communication with a coin delivery chute of a coin operated machine, the self-locking cover assembly including first and second channeled members telescopically engaged, the first channeled member having a window alignable with the delivery chute and a latch assembly, said first channeled member having a slide seated for slidable movement within the cover for selectively covering and uncovering the window, a first spring operable within the cover to bias the slide in window covering condition and a second spring operably seated within the cover assembly and having a blocking portion in bearing relation to said slide selectively to block movement of the slide whereby to prevent uncovering of the window when the covered receptacle is withdrawn from the channeled bracket, the invention comprising said second spring having a weakened portion capable of severance from said second spring upon exercise of sufficient force applied to the blocking portion of said second spring from the exterior of the cover assembly when unauthorized force is applied to the second spring in the course of gaining surreptitious entry to the interior of the coin receptacle during an attempt to lift the blocking portion from blocking condition, the severance resulting in formation of a severed section from said second spring.

2. The structure as claimed in claim 1 in which said second spring comprise a band spring, an end bent formation formed on said band spring and functioning to block said slide.

3. The structure as claimed in claim 1 in which said weakened portion is defined by a transverse score.

4. The structure as claimed in claim 2 in which said weakened portion comprises a transverse score formed in said band spring adjacent said end formation.

5. The structure as claimed in claim 4 in which said transverse score extends directly across said band spring.

6. The structure as claimed in claim 3 in which said score is formed of a plural partial perforations.

7. The structure as claimed in claim 2 in which said severed section includes said end formation.

8. The structure as claimed in claim 1 wherein said second spring comprise a generally flat band spring having a hook formation at one end thereof securable to said first channel member and a free end at the opposite end thereof, said free end terminating in a downwardly depending latch biased toward the floor of said first channel member and disposed in blocking condition relative to said slide means whereby to prevent uncovering of the window, said weakened portion comprising a transverse score formed in said band spring adjacent the hook formation.

9. The structure as claimed in claim 8 in which a strengthening rib is formed in said band spring and said weakened portion is formed intermediate the strengthening rib and the hook formation.

10. The structure as claimed in claim 2 wherein said weakened portion comprises a partially perforate score line formed transverse said band spring.

11. The structure as claimed in claim 2 wherein said weakened portion is formed as an elongate depression.

12. The structure as claimed in claim 2 wherein said weakened portion comprises a transverse groove.

13. The structure as claimed in claim 1 wherein the minimum force required to sever the weakened portion is greater than the force reasonably required normally to lift the blocking portion when originating within the cover.

* * * * *